US010806299B2

(12) United States Patent
Yan

(10) Patent No.: US 10,806,299 B2
(45) Date of Patent: Oct. 20, 2020

(54) OVEN USED FOR HEATING AND BARBECUING

(71) Applicant: Wanguan Metalwork Co., Ltd., Foshan (CN)

(72) Inventor: Jiming Yan, Foshan (CN)

(73) Assignee: Wanguan Metalwork Co., Ltd. (CN)

( * ) Notice: Subject to any disclaimer, the term of this patent is extended or adjusted under 35 U.S.C. 154(b) by 371 days.

(21) Appl. No.: 15/823,964

(22) Filed: Nov. 28, 2017

(65) Prior Publication Data
US 2019/0082886 A1    Mar. 21, 2019

(30) Foreign Application Priority Data

Sep. 21, 2017 (CN) .......................... 2017 1 0857670

(51) Int. Cl.
 *A47J 37/07* (2006.01)
 *F24B 1/02* (2006.01)
 *A47J 37/06* (2006.01)

(52) U.S. Cl.
CPC ........... *A47J 37/0731* (2013.01); *F24B 1/022* (2013.01); *A47J 37/0694* (2013.01); *A47J 2037/0795* (2013.01)

(58) Field of Classification Search
CPC ................ A47J 37/0731; A47J 37/0694; A47J 37/0623; A47J 2037/0795; A47J 37/06; F24B 1/022; F24B 3/00
USPC ............................... 126/25 A, 25 R, 29, 9 B
IPC .......................... A47J 37/07,37/06; F24B 1/02
See application file for complete search history.

(56) References Cited

U.S. PATENT DOCUMENTS

| | | | | |
|---|---|---|---|---|
| 3,316,892 A | * | 5/1967 | Hanke ................. | A47J 37/0786 126/25 R |
| 3,424,145 A | * | 1/1969 | Stitt .................... | A47J 37/0786 126/25 R |
| 3,657,996 A | * | 4/1972 | Thompson .......... | A47J 37/0704 99/443 R |
| 3,667,376 A | * | 6/1972 | Thompson .......... | A47J 37/0704 99/443 R |
| 3,696,800 A | * | 10/1972 | Close, Jr. ............ | A47J 37/0704 126/25 A |
| 3,972,276 A | * | 8/1976 | Kamra ................. | A47J 27/14 99/443 R |
| 4,281,633 A | * | 8/1981 | Wackerman ........ | A47J 37/0704 126/25 A |
| 4,469,019 A | * | 9/1984 | Baer ................... | A47J 37/0745 126/25 AA |
| 4,508,094 A | * | 4/1985 | Hait .................... | F24C 1/16 126/9 B |
| 4,924,845 A | * | 5/1990 | Johnson .............. | A47J 37/0635 126/25 R |

(Continued)

FOREIGN PATENT DOCUMENTS

| | | | | |
|---|---|---|---|---|
| DE | 4132419 A1 | * | 4/1992 | ................. F24B 1/22 |
| DE | 10213454 A1 | * | 3/2003 | .......... A47J 37/0704 |
| FR | 2740316 A1 | * | 4/1997 | .......... A47J 37/0704 |

*Primary Examiner* — Steven B McAllister
*Assistant Examiner* — Daniel E. Namay

(57) ABSTRACT

An oven used for heating and barbecuing comprising an oven body; an isolation plate disposed in the oven body; the isolation plate divides the inner chamber of the oven body into an upper portion and a lower portion; the center of the isolation plate is provided with a ventilation opening; a fire-pan disposed in the inner chamber of the oven body above the isolation plate; a lifting mechanism for propelling the fire-pan to move up and down.

10 Claims, 2 Drawing Sheets

(56) References Cited

U.S. PATENT DOCUMENTS

| | | | | |
|---|---|---|---|---|
| 5,425,352 | A * | 6/1995 | Gillam | A47J 37/0763 126/25 R |
| 5,458,054 | A * | 10/1995 | Yu | A47J 37/0704 126/25 A |
| 5,797,386 | A * | 8/1998 | Orr | A47J 37/0704 126/25 A |
| 5,996,572 | A * | 12/1999 | Ilagan | A47J 37/0786 126/21 A |
| 6,201,217 | B1 * | 3/2001 | Moon | A47J 37/0623 126/21 A |
| 6,929,001 | B2 * | 8/2005 | Yoon | A47J 37/0704 126/25 AA |
| 8,118,019 | B2 * | 2/2012 | DeMars | A47J 37/079 126/152 B |
| 8,485,176 | B2 * | 7/2013 | McLemore | A47J 37/0731 126/154 |
| 9,808,119 | B1 * | 11/2017 | Hough | A47J 37/0731 |
| 2004/0154603 | A1 * | 8/2004 | Crawford | A47J 37/0731 126/25 R |
| 2006/0060182 | A1 * | 3/2006 | Gurney | A47J 33/00 126/29 |
| 2006/0096585 | A1 * | 5/2006 | Dahl | A47J 37/0731 126/25 A |
| 2007/0017500 | A1 * | 1/2007 | Chen | A47J 37/0704 126/25 R |
| 2009/0020109 | A1 * | 1/2009 | Rheault | A47J 33/00 126/25 R |
| 2009/0165772 | A1 * | 7/2009 | Hunt | A47J 36/2477 126/25 R |
| 2010/0212652 | A1 * | 8/2010 | DeMars | A47J 37/079 126/25 B |
| 2011/0168033 | A1 * | 7/2011 | Lee | A47J 37/0623 99/446 |
| 2011/0192390 | A1 * | 8/2011 | Johnson | A47J 33/00 126/30 |
| 2011/0283989 | A1 * | 11/2011 | Ikeda | A47J 37/0704 126/25 A |
| 2012/0012094 | A1 * | 1/2012 | Halperin | A47J 37/07 126/25 R |
| 2015/0030736 | A1 * | 1/2015 | Luther | A23B 4/0523 426/315 |
| 2015/0075514 | A1 * | 3/2015 | Kuenzinger | A47J 37/0763 126/25 A |
| 2015/0297028 | A1 * | 10/2015 | Kazerouni | A47J 37/0786 126/25 AA |
| 2018/0103798 | A1 * | 4/2018 | Rosenbaum | A47J 37/0768 |
| 2018/0160849 | A1 * | 6/2018 | Hebert, Jr. | A47J 37/067 |

* cited by examiner

OVEN USED FOR HEATING AND BARBECUING

TECHNICAL FIELD OF THE INVENTION

The present invention relates to the technical field of heating and barbecue ovens, and more particularly, to an oven used for heating and barbecuing.

BACKGROUND OF THE INVENTION

People need to continuously adapt to and change the natural environment to survive. Getting warm and staying warm are necessary conditions for sustaining life. A traditional method of keeping warm is to acquire the heat generated by combustion. Even today, wood and carbon that can be circularly acquired from nature are often combusted for heating. Compared with the consumption of non-renewable resources, they are more eco-friendly and beneficial to the natural environment. A traditional combustion oven usually adopts a direct ventilation structure. In order to increase the combustion rate, the combustion area is designed to be open. Thus, air can be directly fed into the oven through the air channel and the periphery of the oven mouth. The air inlet is also provided with a flow-regulating insertion plate for controlling the air volume. However, the combustion efficiency of such an oven is very low, leading to a huge waste of heat energy. For a barbecue oven, the distance between the combustion layer and the cooking layer is fixed. Thus, it's difficult to control the cooking firepower, which is very inconvenient.

In conclusion, the shortcomings of traditional heating and barbecue ovens are urgent problems that need to be solved for those skilled in this field.

SUMMARY OF THE INVENTION

The purpose of the present invention is to solve the shortcomings in the prior art by providing an oven used for heating and barbecuing, having a reasonable structure, and is capable of allowing users to change the air volume and the cooking distance by adjusting the height of the fire-pan.

To achieve the above purpose, the present invention adopts the following technical solution:

An oven used for heating and barbecuing comprising an oven body; an isolation plate is disposed in the oven body; the isolation plate divides the inner chamber of the oven body into an upper portion and a lower portion; the center of the isolation plate is provided with a ventilation opening; a fire-pan is disposed in the inner chamber of the oven body that is located above the isolation plate; a lifting mechanism used for propelling the fire-pan to move up and down is disposed in the oven body.

In another aspect of the present invention, the ventilation opening of the isolation plate is provided with a base support, and the base support is provided with a plurality of ventilation holes.

In another aspect of the present invention, the fire-pan is a concave structure that is symmetric from exterior to interior, and the bottom of the fire-pan is provided with a regulating base plate that corresponds to the base support.

In another aspect of the present invention, the lifting mechanism is vertically disposed in the inner chamber of the oven body that is located underneath the isolation plate. A fixing portion of the lifting mechanism is fixed to the oven body. The base support is provided with a through-hole. The upper end of a moving portion of the lifting mechanism, which can move up and down, is inserted into the through-hole. The upper end of the moving portion of the lifting mechanism is lifted on the center of the bottom of the fire-pan.

In another aspect of the present invention, the lifting mechanism comprises a guide tube, a telescopic tube and a handle. The guide tube is vertically disposed, and the lower end of the guide tube is fixed to the oven body. The telescopic tube, which can move up and down, is inserted into the guide tube. The upper end of the telescopic tube is inserted into the through-hole, and is lifted on the regulating base plate of the fire-pan. A transmission rack is disposed in the telescopic tube. The handle, which is rotationally disposed on the side wall of the oven body, is inserted into the side wall of the oven body. The inner end of the handle is inserted into the telescopic tube, and the inner end of the handle is provided with a driving gear that can coordinate with the transmission rack.

In another aspect of the present invention, the inner wall of the oven body is provided with a rotary limiting mechanism that can coordinate with the handle.

In another aspect of the present invention, an annular shelf is disposed in the upper opening of the oven body, and a barbecue grid plate is disposed on the annular shelf.

In another aspect of the present invention, an oven cover is disposed at the upper end of the oven body, and a hook ring is disposed at the top end of the oven cover. A protection ring is annularly disposed on the outer side of the upper opening of the oven body, and a plurality of heat insulation strips is disposed between the protection ring and the oven body.

In another aspect of the present invention, the oven body is a circular drum-shaped structure, and the diameter of the upper opening of the oven body is greater than that of the lower opening of the oven body.

In another aspect of the present invention, the oven body comprises an oven neck, an oven trunk and an oven bed, wherein the oven neck, the oven trunk and the oven bed are sequentially connected from top to bottom. The lower opening of the oven neck and the upper opening of the oven trunk are respectively provided with a first annular assembling ring, and the lower opening of the oven trunk and the upper opening of the oven bed are respectively provided with a second annular assembling ring.

In another aspect of the present invention, the annular shelf is disposed in the upper opening of the oven neck, and the protection ring is sleeved on the outer side of the upper opening of the oven neck. A plurality of decorative bulges is distributed on the outer surface of the oven neck.

In another aspect of the present invention, the isolation plate is transversely disposed in the middle of the oven trunk. The edge of the isolation plate is in close contact with the side wall of the oven trunk, thereby dividing the oven body into an upper inner chamber and a lower inner chamber. A non-closed bottom support is disposed on the second annular assembling ring, and the lower end of the guide tube is fixed on the bottom support.

Compared with the prior art, the present invention has the following advantages:

The present invention has a reasonable structure. The lifting mechanism is capable of propelling the fire-pan to move up and down so that the distance between the foods on the barbecue grid plate and the fire source can be conveniently adjusted. Thus, the firepower and the cooking temperature can be easily controlled. Furthermore, the combustion temperature can be regulated through changing the air volume of the ventilation opening, enabling the combustion progress of the fuel to be easily controlled. The split structure adopted in the present invention achieves a convenient assembly and a high structural strength, greatly facilitating the bulk transportation and on-site assembly.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

MARKING INSTRUCTIONS OF THE DRAWINGS

1, Oven Body; 2, Isolation Plate; 3, Fire-pan; 5, Oven Cover; 11, Oven Neck; 12, Oven Trunk; 13, Oven Bed; 14, The First Assembling Ring; 15, The Second Assembling Ring; 16, Bottom Support; 21, Ventilation Opening; 22, Base Support; 23, Ventilation Hole; 24, Through-hole; 31, Regulating Base Plate; 41, Guide Tube; 42, Telescopic Tube; 43, Handle; 44, Transmission Rack; 45, Driving Gear; 51, Hook Ring; 52, Shelf; 53, Barbecue Grid Plate; 54, Protection Ring; 55, Heat Insulation Strip; 56, Decorative Bulges

DETAILED DESCRIPTION OF THE INVENTION

Drawings and detailed embodiments are combined hereinafter to elaborate the technical principles of the present invention.

Figure 1:
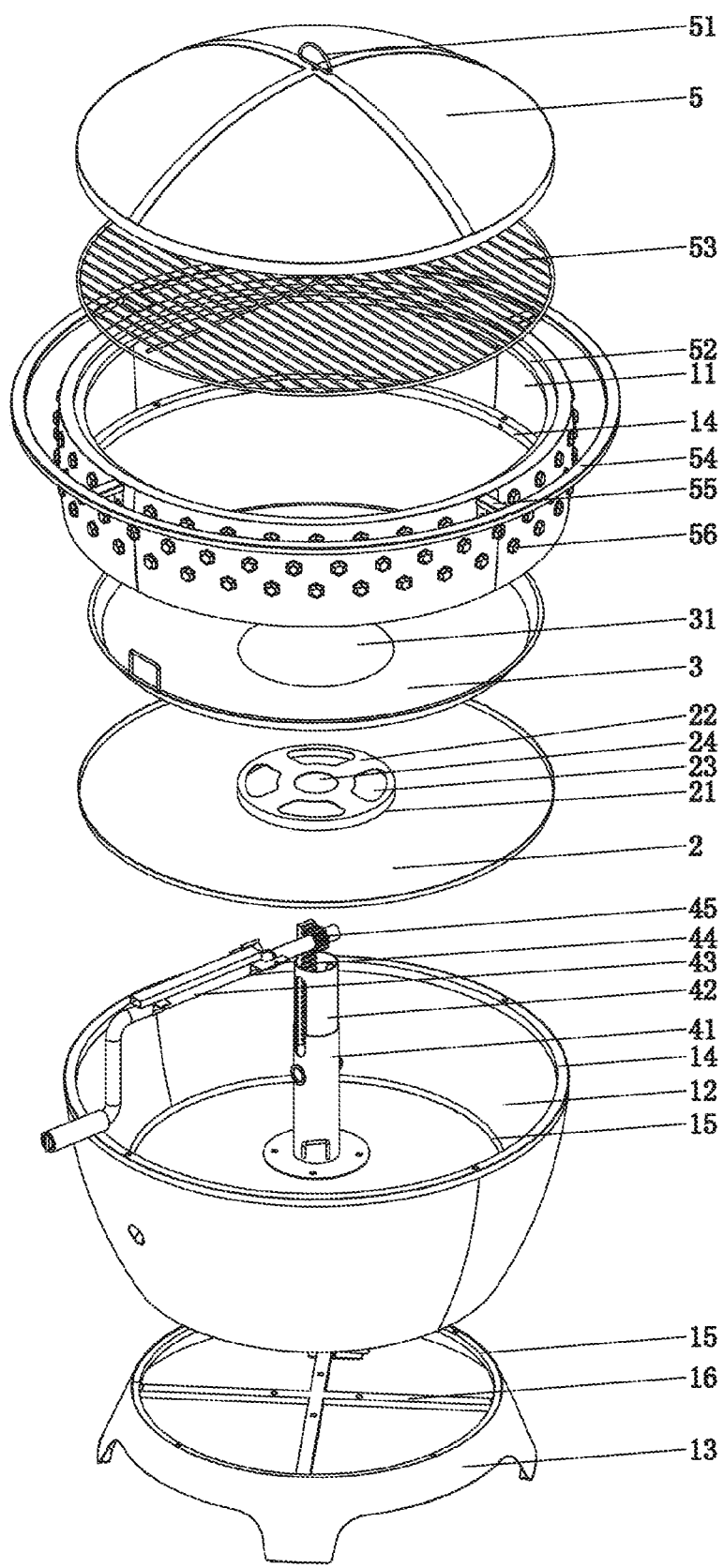
FIG. 1 is an exploded view illustrating the overall structure of the present invention.
Figure 2:
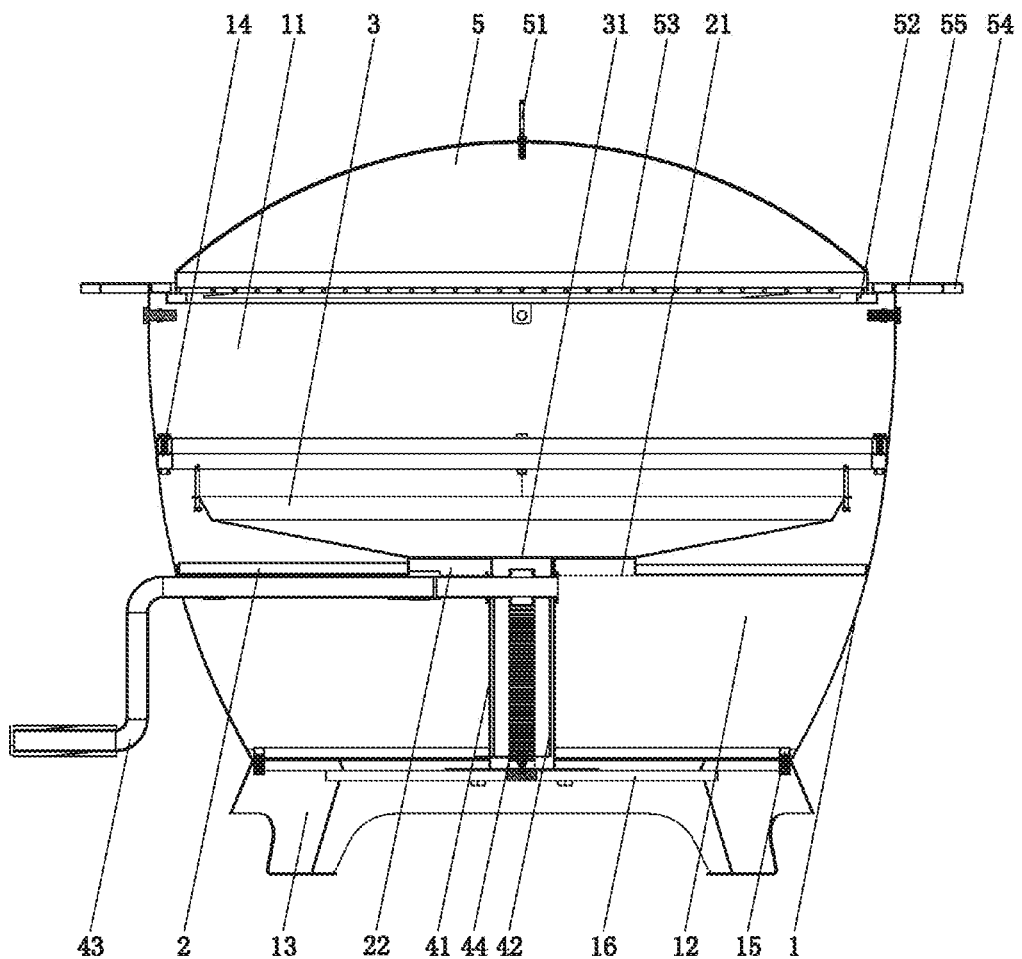
FIG. 2 is a side sectional view of the present invention.

As shown in FIG. 1, an oven used for heating and barbecuing of the present invention comprises an oven body 1. An isolation plate 2 is disposed in the oven body 1. The isolation plate 2 divides the inner chamber of the oven body 1 into an upper portion and a lower portion. The center of the isolation plate 2 is provided with a ventilation opening 21. A fire-pan 3 is disposed in the inner chamber of the oven body 1 that is located above the isolation plate 2. A lifting mechanism used for propelling the fire-pan 3 to move up and down is disposed in the oven body 1. The upper end and the lower end of the oven body 1 are respectively provided with an opening. The fuel is combusted on the fire-pan 3 in the upper inner chamber of the oven body 1. The external air can enter into the upper inner chamber of the oven body 1 from the upper opening or the ventilation opening 21. Due to the combustion of the fuel, the air in the upper inner chamber of the oven body 1 is heated to generate a rising air flow, thereby promoting more external air to enter into the inner chamber from the lower portion of the furnace body 1. The height of the fire-pan 3 in the oven body 1 can be adjusted through the lifting mechanism. When the fire-pan 3 moves downwards to the lower limit position, the ventilation opening 21 can be completely blocked by the fire-pan 3. Thus, external air is prevented from entering through the ventilation opening 21, which can effectively inhibit the combustion. When the fire-pan 3 moves upwards, the distance between the fire-pan 3 and the isolation plate 2 is changed. As a result, the volume of the air passing through the ventilation opening 21 is changed, thereby achieving the control of the combustion degree during the heating process.

Furthermore, the present invention can be used for barbecuing. The foods are placed in the upper opening of the oven body 1. Through adjusting the height of the fire-pan, the distance between the fire source and the foods can be changed. Thus, the firepower and the cooking degree can be conveniently controlled by users.

The ventilation opening 21 of the isolation plate 2 is provided with a base support 22, and the base support 22 is provided with a plurality of ventilation holes 23. The base support 22 and the isolation plate 2 are molded in one body. The caliber of the base support 22 is configured to correspond to the contact surface of the bottom of the fire-pan 3, and the base support 22 is used for controlling the range of the ventilation opening 21. Thus, the ventilation hole 23 can be completely blocked when the fire-pan 3 moves to the lower limit position. The upper end surface of the base support 22 is provided with a plurality of ventilation holes, which can be adjusted according to the size of the oven body 1. Thus, an ideal combustion efficiency of the oven body 1 can be achieved.

The fire-pan 3 is a concave structure that is symmetric from exterior to interior, and the bottom of the fire-pan 3 is provided with a regulating base plate 31 that corresponds to the base support 22. The regulating base plate 31 and the fire-pan 3 are molded in one body. The regulating base plate 31 can coordinate with the base support 22 to completely block the ventilation opening 21. The regulating base plate 31 is preferably a plane plate structure. The regulating base plate 31 forms a flat bottom structure in the central area of the fire-pan 3.

The lifting mechanism is vertically disposed in the inner chamber of the oven body 1 located underneath the isolation plate 2. A fixing portion of the lifting mechanism is fixed to the oven body 1. The base support 22 is provided with a through-hole 24. The upper end of a moving portion of the lifting mechanism, which can move up and down, is inserted into the through-hole 24. The upper end of the moving portion of the lifting mechanism is lifted on the center of the bottom of the fire-pan 3. The lifting mechanism is inserted into the through-hole 24 to propel the fire-pan 3 to move, thereby changing the air flow in the ventilation opening 21. The lifting mechanism is in contact with the fire basin 3, and the lifting mechanism is supported on the center balance point of the fire-pan 3. Thus, the fire-pan 3 can be directly removed and the combustion residue can be easily treated.

The lifting mechanism comprises a guide tube 41, a telescopic tube 42 and a handle 43. The guide tube 41 is vertically disposed, and the lower end of the guide tube is fixed to the oven body 1. The telescopic tube 42, which can move up and down, is inserted into the guide tube 41. The upper end of the telescopic tube 42 is inserted into the through-hole 24, and is lifted onto the regulating base plate 31 of the fire-pan 3. A transmission rack 44 is disposed in the telescopic tube 42. The handle 43, which is rotationally disposed on the side wall of the oven body 1, is inserted into the side wall of the oven body 1. The inner end of the handle 43 is inserted into the telescopic tube 42, and the inner end of the handle 43 is provided with a driving gear 45 that can coordinate with the transmission rack 44. The outer end of the handle 43 is rotationally connected to the oven body 1. The driving gear 45 coordinates with the transmission rack 44 to adjust the height of the telescopic tube 42 on the guide tube 41.

The inner wall of the oven body 1 is provided with a rotary limiting mechanism that can coordinate with the handle 43. The rotary limiting mechanism comprises a tooth disc and a locating pin. The tooth disc is installed on a rotary portion that connects the handle 43 and the oven body 1. The locating pin is placed on the oven body 1 that is located on one side of the tooth disc. The locating pin is inserted into the tooth disc to limit the rotation of the handle 43.

An annular shelf 52 is disposed in the upper opening of the oven body 1, and a barbecue grid plate 53 is disposed on the annular shelf 52. The annular shelf 52 is lower than the plane of the upper opening of the oven body 1. Thus, the annular shelf 52 and the upper opening of the oven body 1 form a T-shaped structure. The diameter of the barbecue grid plate 53 is greater than the inner diameter of the annular shelf 52 so that the barbecue grid plate 53 can be conveniently placed and disassembled.

An oven cover 5 is disposed at the upper end of the oven body 1, and a hook ring 51 is disposed at the top end of the oven cover 5. A protection ring 54 is annularly disposed on the outer side of the upper opening of the oven body 1, and a plurality of heat insulation strips 55 is disposed between the protection ring 54 and the oven body 1. The protection ring 54 forms a safe isolation distance on the outer side of the oven body 1 through the heat insulation strips 55, thereby reducing the risk of body injury caused by directly touching the oven body 1.

The oven body 1 is a circular drum-shaped structure, and the diameter of the upper opening of the oven body 1 is greater than that of the lower opening of the oven body 1. The upper opening of the oven body 1 is relatively large, allowing the waste gas of combustion to be easily discharged. The lower opening of the oven body 1 is small, thereby forming a streamline structure. When entering into the upper inner chamber of the oven body 1 from the lower opening of the oven body 1 and the ventilation opening 21, the external air flows to the two sides of the fire-pan 3 along the bottom surface of the fire-pan 3. The external air is in contact with the fuel on the fire-pan 3 under the guide of the arc-shaped inner wall of the oven body 1. Thus, the fuel on the fire-pan 3 is combusted from exterior to interior, and the combustion time of the fuel can be prolonged during the heat-preserving process. Meanwhile, the temperature of the central area of the fire-pan 3 can be greatly increased, achieving a high cooking efficiency.

The oven body 1 comprises an oven neck 11, an oven trunk 12 and an oven bed 13, wherein the oven neck 11, the oven trunk 12 and the oven bed 13 are sequentially connected from top to bottom. The lower opening of the oven neck 11 and the upper opening of the oven trunk 12 are respectively provided with a first annular assembling ring 14, and the lower opening of the oven trunk 12 and the upper opening of the oven bed 13 are respectively provided with a second annular assembling ring 15. The oven body 1 is an assembly structure consisted of upper, middle and lower portions. The three portions can be quickly assembled through the first assembling ring 14 and the second assembling ring 15. Such a structure can satisfy the requirement of on-site assembly of the online-shopping mode. Meanwhile, the production efficiency can be improved and the production difficulty can be reduced.

The annular shelf 52 is disposed in the upper opening of the oven neck 11, and the protection ring 54 is sleeved on the outer side of the upper opening of the oven neck 11. A plurality of decorative bulges 56 is distributed on the outer surface of the oven neck 11. The annular shelf 52 is located in the upper opening of the oven neck 11, and the fire-pan 3 is located in the middle of the oven trunk 12. The distance between the isolation plate 2 and the annular shelf 52 is the travel distance that the fire-pan 3 can be propelled by the lifting mechanism. Through adjusting the height of the fire-pan 3 in the oven body 1, the firepower and cooking temperature required during barbecuing can be adjusted by users. The decorative bulges 56 are hexagonal screw-shaped, and the decorative bulges 56 are arranged at equal intervals on the outer wall of the oven neck 11. Thus, the overall appearance of the oven body resembles a Chinese traditional dragon drum, which is aesthetically pleasing. The plurality of decorative bulges 56 also increase the contact surface between the oven body 1 and the external air so that the heat exchange efficiency of the oven body 1 can be improved.

The isolation plate 2 is transversely disposed in the middle of the oven trunk 12. The edge of the isolation plate 2 is in close contact with the side wall of the oven trunk 12, thereby dividing the oven body 1 into an upper inner chamber and a lower inner chamber. A non-closed bottom support 16 is disposed on the second annular assembling ring 15, and the lower end of the guide tube 41 is fixed on the bottom support 16.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:
1. An oven used for heating and barbecuing, comprising:
an oven body, wherein an isolation plate is disposed in the oven body, wherein the isolation plate divides the oven body into an upper portion and a lower portion by substantially seal the upper portion from the lower portion, wherein the center of the isolation plate is provided with a ventilation opening, wherein a fire-pan is disposed in the inner chamber of the oven body that is located above the isolation plate, wherein a lifting mechanism is disposed in the lower portion of the inner chamber, wherein the lifting mechanism propels the fire pan to move up and down in the upper portion by reaching into the upper portion through a through hole on the isolation plate, wherein the isolation plate does not move with the fire pan.

2. The oven used for heating and barbecuing of claim 1, wherein the ventilation opening of the isolation plate is provided with a base support, and the base support is provided with a plurality of ventilation holes.

3. The oven used for heating and barbecuing of claim 2, wherein the fire-pan is a concave structure that is symmetric from exterior to interior, and the bottom of the fire-pan is provided with a regulating base plate that corresponds to the base support, wherein the base plate is capable of completely blocking the ventilation holes.

4. The oven used for heating and barbecuing of claim 1, wherein the lifting mechanism is vertically disposed in the inner chamber of the oven body that is located underneath the isolation plate, wherein a fixing portion of the lifting mechanism is fixed to the oven body, wherein the base support is provided with a through-hole, wherein the upper end of a moving portion of the lifting mechanism, which can move up and down, is inserted into the through-hole, wherein the upper end of the moving portion of the lifting mechanism is lifted on the center of the bottom of the fire-pan.

5. The oven used for heating and barbecuing of claim 4, wherein the lifting mechanism comprises a guide tube, a telescopic tube and a handle, wherein the guide tube is vertically disposed, and a lower end of the guide tube is fixed to the oven body, wherein the telescopic tube, which can move up and down, is inserted into the guide tube, wherein the upper end of the telescopic tube is inserted into the through-hole, and is lifted on the regulating base plate of the fire-pan, wherein a transmission rack is disposed in the telescopic tube, wherein the handle, which is rotationally disposed on the side wall of the oven body, is inserted into the side wall of the oven body, wherein an inner end of the handle is inserted into the telescopic tube, and the inner end of the handle is provided with a driving gear that can coordinate with the transmission rack.

6. The oven used for heating and barbecuing of claim 5, wherein the inner wall of the oven body is provided with a rotary limiting mechanism that can coordinate with the handle.

7. The oven used for heating and barbecuing of claim 1, wherein an annular shelf is disposed in an upper opening of the oven body, and a barbecue grid plate is disposed on the annular shelf, wherein an oven cover is disposed at an upper end of the oven body, and a hook ring is disposed at a top end of the oven cover, wherein a protection ring is annularly disposed on an outer side of the upper opening of the oven body, and a plurality of heat insulation strips is disposed between the protection ring and the oven body.

8. The oven used for heating and barbecuing of claim 7, wherein the oven body is a circular drum-shaped structure, and the diameter of the upper opening of the oven body is greater than that of a lower opening of the oven body, wherein the oven body comprises an oven neck, an oven trunk and an oven bed, wherein the oven neck, the oven trunk and the oven bed are sequentially connected from top to bottom, wherein the lower opening of the oven neck and the upper opening of the oven trunk are respectively provided with a first annular assembling ring, and the lower opening of the oven trunk and the upper opening of the oven bed are respectively provided with a second annular assembling ring.

9. The oven used for heating and barbecuing of claim 8, wherein the annular shelf is disposed in the upper opening of the oven neck, and the protection ring has a larger diameter than the oven neck, wherein the protection ring is concentrically connected to the oven neck through a plurality of heat insulating strips, wherein the diameter of the oven neck is smaller than the diameter of the upper opening of the oven trunk, wherein the heat insulation strips rest on top of the first assembling ring, wherein a plurality of decorative bulges is distributed on an outer surface of the oven neck.

10. The oven used for heating and barbecuing of claim 9, wherein the isolation plate is transversely disposed in the middle of the oven trunk, wherein the edge of the isolation plate is in close contact with the side wall of the oven trunk, thereby dividing the oven body into an upper inner chamber and a lower inner chamber, wherein a non-closed bottom support is disposed on the second annular assembling ring, and a lower end of the guide tube is fixed on the bottom support.

* * * * *